(12) United States Patent
Redshaw et al.

(10) Patent No.: US 8,669,987 B2
(45) Date of Patent: Mar. 11, 2014

(54) MEMORY MANAGEMENT FOR SYSTEMS FOR GENERATING 3-DIMENSIONAL COMPUTER IMAGES

(75) Inventors: Jonathan Redshaw, Hemel Hempstead (GB); Steve Morphet, Hemel Hempstead (GB)

(73) Assignee: Imagination Technologies, Ltd., Kings Langley, Hertfordshire (GB)

( * ) Notice: Subject to any disclaimer, the term of this patent is extended or adjusted under 35 U.S.C. 154(b) by 864 days.

(21) Appl. No.: 11/707,209

(22) Filed: Feb. 15, 2007

(65) Prior Publication Data

US 2008/0186318 A1     Aug. 7, 2008

(30) Foreign Application Priority Data

Sep. 29, 2006 (GB) .................................. 0619327.0

(51) Int. Cl.
*G06F 12/02* (2006.01)
*G09G 5/36* (2006.01)

(52) U.S. Cl.
USPC .......................................... 345/443; 345/553

(58) Field of Classification Search
USPC ......................................................... 345/553
See application file for complete search history.

(56) References Cited

U.S. PATENT DOCUMENTS

| | | | | |
|---|---|---|---|---|
| 4,967,375 A | * | 10/1990 | Pelham et al. | 345/564 |
| 5,509,110 A | | 4/1996 | Latham | |
| 5,577,243 A | * | 11/1996 | Sherwood et al. | 1/1 |
| 5,867,166 A | | 2/1999 | Myhrvold et al. | |

(Continued)

FOREIGN PATENT DOCUMENTS

| | | |
|---|---|---|
| EP | 0 829 820 A2 | 3/1998 |
| EP | 1287494 B1 | 3/2003 |

(Continued)

OTHER PUBLICATIONS

A. Law, R. Yagel; CellFlow: A Parallel Rendering Scheme for Distributed Memory Architectures; Proceedings of the International Conference on Parallel and Distributed Processing Techniques and Applications, PDPTA '95, Athens GA, Nov. 1995, pp. 3-12.*

(Continued)

*Primary Examiner* — Carlos Perromat
(74) *Attorney, Agent, or Firm* — Michael S. Gerrabrants

(57) ABSTRACT

Memory management system and method for use with systems for generating 3-dimensional computer generated images are provided. The system includes a) a device for subdividing the image into rectangular areas, b) a memory for storing object data for each rectangular area and depth data derived from the object data, c) a device for storing the object data in the memory, d) a device for deriving the depth data for each rectangular area from the object data, e) a device for storing the depth data for each rectangular area in the memory, f) a device for loading further object data into the memory to replace part of the existing contents, g) a device for retrieving the stored depth data, h) a device for deriving updated depth data for each picture element of each rectangular area from the new object and stored depth data, and storing the updated depth data to replace the previously stored depth data, i) a device for causing features e), f), g) and h) to repeatedly perform the functions until there is no further object data to load to the 1 memory, and j) a device for deriving image data and shading data from the depth data for display.

26 Claims, 9 Drawing Sheets

(56) References Cited

U.S. PATENT DOCUMENTS

| | | | |
|---|---|---|---|
| 6,084,591 | A | 7/2000 | Aleksic |
| 6,104,417 | A | 8/2000 | Nielsen et al. |
| 6,229,553 | B1 * | 5/2001 | Duluk et al. .................. 345/506 |
| 6,323,860 | B1 | 11/2001 | Zhu et al. |
| 6,326,964 | B1 | 12/2001 | Snyder et al. |
| 6,348,919 | B1 | 2/2002 | Murphy |
| 6,380,935 | B1 | 4/2002 | Heeschen et al. |
| 6,501,481 | B1 | 12/2002 | Wood et al. |
| 6,593,929 | B2 | 7/2003 | Van Hook et al. |
| 6,664,962 | B1 | 12/2003 | Komsthoeft et al. |
| 6,697,063 | B1 | 2/2004 | Zhu |
| 6,798,410 | B1 | 9/2004 | Redshaw et al. |
| 6,856,320 | B1 | 2/2005 | Rubinstein et al. |
| 7,102,646 | B1 * | 9/2006 | Rubinstein et al. ........... 345/570 |
| 7,170,515 | B1 | 1/2007 | Zhu |
| 7,310,100 | B2 | 12/2007 | Hussain |
| 7,324,115 | B2 | 1/2008 | Fraser |
| 7,385,608 | B1 | 6/2008 | Baldwin |
| 7,405,734 | B2 | 7/2008 | Foran |
| 7,808,503 | B2 | 10/2010 | Duluk, Jr. et al. |
| 8,046,761 | B2 | 10/2011 | Howson |
| 2002/0039100 | A1 | 4/2002 | Morphet |
| 2004/0155878 | A1 | 8/2004 | Inazumi |
| 2004/0233207 | A1 * | 11/2004 | Morphet ....................... 345/553 |
| 2005/0057571 | A1 | 3/2005 | Stevens |
| 2005/0122338 | A1 | 6/2005 | Hong et al. |
| 2005/0285867 | A1 * | 12/2005 | Brunner et al. ............... 345/537 |
| 2007/0022052 | A1 | 1/2007 | Ganesan et al. |
| 2007/0132772 | A1 | 6/2007 | Morphet |
| 2007/0146378 | A1 | 6/2007 | Sorgard et al. |

FOREIGN PATENT DOCUMENTS

| | | |
|---|---|---|
| EP | 1351195 A2 | 10/2003 |
| GB | 2 281 682 A | 3/1995 |
| GB | 2 298 111 A | 8/1996 |
| JP | 2003-529860 | 10/2003 |
| JP | 2003-536153 | 12/2003 |
| WO | WO 00/28483 | 5/2000 |
| WO | WO 01/95257 A1 | 12/2001 |

OTHER PUBLICATIONS

United Kingdom Combined Search and Examination Report dated Dec. 21, 2006 (5 pages).
International Search Report and Written Opinion of the International Searching Authority, mailed Mar. 9, 2009 (22 sheets).
Akenine-Möller T et al: "Real-Time Rendering, $2^{nd}$ Edition" Jan. 1, 2002, XP002517007, pp. 705-708 (4 pages).
European Patent Office Search Report dated Jun. 27, 2007 (4 pages).
Japanese Office Action dated Dec. 14, 2011 (4 pages).
Japanese Office Action dated Aug. 6, 2012, with English translation of pertinent parts (9 pages).
SGI New Desktop Workstation, O2 Technical Guide, Software Design, Jan. 1997, pp. 91-99.
Function required for 3D graphics accelerator and Power VR, by A. Hanai, Interface, Japan, Dec. 1997, vol. 23, pp. 107-116.
New generation 3D engine development by JP, with a view to the technical corporation with Microsoft, by G. Kakogawa, Nikkei Computer Graphics, Japan, Jul. 1997, vol. 130, (7 pages).

* cited by examiner

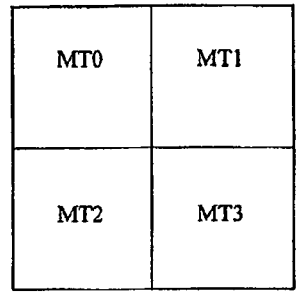

| MT0: 025 |
| MT1: 0.125 |
| MT3: 0.1875 |
| MT2: 0.4375 |
| ZB0 | ← Reserved z buffer

Figure 7c

| MT0: 025 |
| MT1: 0.125 |
| MT3: 0.1875 |
| (Free for more object data) |
| ZB1 | ← Reserved z buffer
| ZB0 (allocated To MT2): 0.25 |

Figure 7d

| MT0: 025 |
| MT1: 0.125 |
| MT3: 0.1875 |
| MT2: 0.1875 |
| ZB1 | ← Reserved z buffer
| ZB0 (allocated To MT2): 0.25 |

Figure 7e

| ZB2 | ← Reserved z buffer
| MT1: 0.125 |
| MT3: 0.1875 |
| MT2: 0.1875 |
| ZB1 (allocated To MT0): 0.25 |
| ZB0 (allocated To MT2): 0.25 |

Figure 7f

| ZB2 (allocated to MT3): 0.25 |
| MT1: 0.125 |
| (Free for more object data) |
| ZB3 | ← Reserved z buffer
| ZB1 (allocated To MT0): 0.25 |
| ZB0 (allocated To MT2): 0.25 |

Figure 7g

| ZB2 (allocated to MT3): 0.25 |
| (Free for more object data) |
| ZB3 (allocated To MT1): 0.25 |
| ZB1 (allocated To MT0): 0.25 |
| ZB0 (allocated To MT2): 0.25 |

MEMORY MANAGEMENT FOR SYSTEMS FOR GENERATING 3-DIMENSIONAL COMPUTER IMAGES

FIELD OF THE INVENTION

This invention relates to memory management for use with systems for generating 3-dimensional computer generated images.

BACKGROUND OF THE INVENTION

In the applicant's UK Patent No. 2281682, there is described a 3-D rendering system for polygons in which each object is seen to be viewed as defined in a set of surfaces which are infinite. Each elementary area of the screen (e.g. pixel) in which an image is to be displayed has a ray projected through it from a viewpoint into the 3-D scene. The location of the intersection of the projected ray with each surface is then determined. From these intersections, it is then possible to determine whether any intersected surface is visible at that elementary area. The elementary area is then shaded for display in dependence on the results of the determination.

The system can be implemented in a pipeline type processor comprising a number of cells, each of which can perform an intersection calculation with a surface. Thus, a large number of surface intersections can be computed simultaneously. Each cell is loaded with a set of coefficients defining the surface for which it is to perform the intersection test.

An improvement to this arrangement is described in the applicant's UK Patent No. 2298111. In that document, the image is divided into sub-regions or tiles and the tiles can be processed in turn. It is proposed to use a variable tile size and to project a bounding box around complete objects so that only those tiles falling within the bounding box require processing. This is done by determining the distribution of objects on the visible screen, in order for a suitable tile size to be selected. The surfaces which define the various objects are then stored in a list, known as the display list, thereby avoiding the need to store identical surfaces for each tile, since one object made of many surfaces could appear in a number of tiles. Object pointers which identify the objects in the display list are also stored. There is one object pointer list per tile. The tiles can then be rendered in turn using the ray casting technique described above until all objects within each tile are processed. This is a useful method because no effort needs to be made to render objects which are known not to be visible in a particular tile.

A further improvement on this system is proposed in the applicant's International Patent Application No. PCT/GB99/03707, in which any tiles within the bounding box which are not required to display a particular object are discarded before rendering.

FIG. 1 shows the type of processor 101 used in the existing systems described above. Essentially, there are three components. The tile accelerator unit (TA) 103 performs the tiling operation i.e. selects a suitable tile size and divides the visible screen into tiles, and supplies the tile information i.e. the 3-D object data for each tile, to the display list memory 105. The image synthesis processor (ISP) 107 uses the 3-D object data in the display list memory to perform the ray/surface intersection tests discussed above. This produces depth data for each elementary area of the visible screen. After this, the derived image data from the ISP 107 is supplied to texturing and shading processor (TSP) 109 which applies texturing and shading data to surfaces which have been determined as visible and outputs image and shading data to a frame buffer memory 111. Thus, the appearance of each elementary area of the display is determined so as to represent the 3-D image.

In the systems described above, a problem may arise as the complexity of the scene to be rendered increases. Complex scenes require more 3-D object data for each tile to be stored in the display list memory and this means that storage requirements increase. If the display list memory runs out of space, parts of the scene may simply not be rendered and this type of image corruption is becoming less and less acceptable.

In order to solve this problem, the applicant's International Patent Application No. PCT/GB01/02536 proposes the idea of partial rendering. The state of the system (ISP and TSP) is stored to memory before rendering of a tile is complete, and the state is reloaded at a later time in order to finish the rendering. This process is referred to as "z/frame buffer load and store".

The screen is divided up into a number of regions called macro-tiles, each macro-tile consisting of a rectangular region of the screen. Memory in the display list is then divided into blocks and these are listed in a free store list. Blocks from the free store are then allocated to the macro-tiles as required. The tiling operation stores data associated with each macro-tile in each block. (The tiling operation performed by the TA fills the display list memory so is sometimes referred to as Memory Allocation.) When the display list memory fills up, or reaches some predefined threshold, the system selects a macro-tile, performs a z/frame buffer load, and renders the contents of the macro-tile before saving it using a z/frame buffer store operation. Thus, depth data for the macro-tile is stored according to the data loaded into the display list so far. Upon completion of such a render, the system frees any memory blocks associated with that macro-tile, thereby making them available for further storage. (Because the rendering process frees up display list memory space, it is known as Memory De-Allocation.) So, the scene for each tile is constructed by a number of tiling operations followed by partial renders. Each partial render updates the depth data stored. This means that an upper bound on the memory consumption is imposed and also the memory bandwidth consumed by the system is minimised.

One example of a type of processor used in the partial rendering system is shown in FIG. 2. It can be seen that this is a modified version of FIG. 1. A z buffer memory 209 is linked to the ISP 207 via a z compression/decompression unit 211. This comes into operation when the system is rendering a complex scene and the display list memory 205 is not large enough to contain all the surfaces which need to be processed for a particular tile. The display list will be loaded with data by the TA 203 for all the tiles until it is substantially full (or until a predefined threshold is reached.) This may, however, only represent a portion of the initial data. The image is rendered one tile at a time by ISP 207. The output data for each tile is provided to TSP 213, which uses texture data to texture the tile. At the same time, because the image data was incomplete, the result (i.e. depth data) from ISP 207 is stored to buffer memory 209 via compression/decompression unit 211 for temporary storage. The rendering of the remaining tiles then continues with the incomplete image data until all the tiles have been rendered and stored in frame buffer memory 215 and in z buffer memory 209.

The first part of the display list is then discarded and the additional image data read into it. As processing is performed for each tile in turn by ISP 207, the relevant portion of data from z buffer memory 209 is loaded via the z compression/decompression unit 18 so that it can be combined with the new image data from display list memory 205. The new depth data for each tile is then fed to TSP 213 which combines it with texture data before supplying it to the frame buffer 215.

This process continues for all the tiles in the scene and until all the image data has been rendered. Thus, it can be seen that the z buffer memory fills a temporary store which enables a smaller display list memory to be used than would be necessary for rendering particularly complex scenes. The compression/decompression unit 211 is optional but it enables a smaller z buffer memory to be used.

So, as discussed in International Patent Application No. PCT/GB01/02536, once the display list memory fills up, or reaches a certain threshold, the system selects a macro-tile to render in order to free up some display list memory. In that application, the selection of the macro-tile to render depends on a number of factors, for example the macro-tile which will release the most memory back to the free-store may be chosen.

The inventors of the present invention have seen that various improvements could be made to the memory management in that system.

It is an object of the present invention to provide a memory management system and method which reduces the memory footprint and improves performance when compared with known systems described above. It is a further object of the present invention to provide a memory management system and method which can deal with several applications running simultaneously.

SUMMARY OF THE INVENTION

According to a first aspect of the invention, there is provided a memory management system for use with systems for generating 3-dimensional computer images, the system comprising: a) means for subdividing the image into a plurality of rectangular areas; b) a memory having, at any one time, a first portion or portions for storing object data for each rectangular area and a second portion or portions for storing depth data derived from the object data; c) means for storing the object data in the first portion or portions of the memory; d) means for deriving the depth data for each rectangular area, from the object data; e) means for storing the depth data for each rectangular area in the second portion or portions of the memory; f) means for loading further object data into one or more of the first portion or portions of the memory to replace at least part of the existing contents; g) means for retrieving the stored depth data; h) means for deriving updated depth data for each picture element of each rectangular area from the new object data and the stored depth data, and storing the updated depth data to replace the previously stored depth data; i) means for causing features e), f), g) and h) to repeatedly perform the functions until there is no further object data to load to the memory; and j) means for deriving image data and shading data from the depth data, for display.

Thus, the object data and the depth data are stored in a single memory. Thus, the memory requirement can be reduced. Note that the portion or portions allocated to the object data are not fixed since the amount of memory required for object data will change as the features perform their functions. If there is, at a particular time, more than one portion of the memory allocated to object data, the portions may be adjacent in the memory or may be interspersed with other portions of the memory allocated for different purposes. Similarly, the portion or portions allocated to the depth data are not fixed since the amount of memory required for depth data will change as the features perform their functions. If there is, at a particular time, more than one portion of the memory allocated to depth data, the portions may be adjacent in the memory or may be interspersed with other portions of the memory allocated for different purposes.

The means for subdividing the image into a plurality of rectangular areas may be arranged to select the size of the rectangular areas according to the particular image to be generated. The rectangular areas may be equal or different in size and shape.

Preferably, the first portion or portions of the memory and the second portion or portions of the memory are allocated from unused portions of the memory according to requirements, such that the size of the first and second portion or portions and the location of the first and second portion or portions, within the memory, dynamically change as the features c), d), e), f), g), h) and i) perform their functions.

Preferably, a second portion or portions are always reserved for depth data for at least one rectangular area, so that, if there is object data stored in the memory, it is always possible for features d) and e) to perform their functions.

In another embodiment, feature e) comprises means for compressing the depth data before it is stored, and a second portion or portions are always reserved for depth data for at least two rectangular areas, so that, if there is object data stored in the memory, it is always possible for features d) and e) to perform their functions.

By reserving an appropriate section of the memory in this way, it is always possible to derive further depth data and store it in the second portion or portions of the memory. This means that, however complex the image, it can always be generated. In one embodiment, the amount reserved is sufficient for depth data for each elementary area of one macro-tile. In another embodiment, the amount reserved is sufficient for depth data for each elementary area of two macro-tiles.

In one embodiment, the means for storing the object data in the first portion or portions of the memory is arranged to store object data falling in only one rectangular area in a block of memory allocated to that rectangular area, and object data falling in more than one rectangular area in a block of memory allocated as a global list for storing object data falling in more than one rectangular area. In that case, the image data and shading data for a particular rectangular area is derived from the depth data for that macro-tile and also from the depth data in the global list. Once the image data and the shading have been derived for a particular rectangular area, that block of the memory allocated for depth data for that rectangular area can be marked as free. Once the image data and the shading data have been derived for all the rectangular areas, the global list can also be marked as free.

According to the first aspect of the invention, there is also provided a method for managing memory in a system for generating 3-dimensional computer images, the method comprising the steps of: a) subdividing the image into a plurality of rectangular areas; b) providing a memory having, at any one time, a first portion or portions for storing object data for each rectangular area and a second portion or portions for storing depth data derived from the object data; c) storing the object data in the first portion or portions of the memory; d) deriving the depth data for each rectangular area, from the object data; e) storing the depth data for each rectangular area in the second portion or portions of memory; f) loading further object data into one or more of the first portion or portions of the memory to replace at least part of the existing contents; g) retrieving the stored depth data; h) deriving updated depth data for each picture element of each rectangular area from the new object data and the stored depth data, and storing the updated depth data to replace the previously stored depth data; i) repeating steps e), f), g) and h) until there is no further object data to load into the memory; and j) deriving image data and shading data from the depth data, for display.

Aspects described in relation to the method of the first aspect of the invention may also be applicable to the system of the first aspect of the invention, and aspects described in relation to the system of the first aspect of the invention may also be applicable to the method of the first aspect of the invention.

According to a second aspect of the invention, there is provided a memory management system for use with systems for generating 3-dimensional computer images, comprising: a) means for subdividing the image into a plurality of rectangular areas; b) a memory for storing object data pertaining to objects in the image which fall in each rectangular area, the memory comprising i) at least one portion allocated to each rectangular area for storing object data pertaining to objects in the respective rectangular area and ii) at least one portion allocated as a global list for storing object data pertaining to objects falling in more than one rectangular area; c) means for storing the object data in the memory; d) deriving means for deriving image data and shading data for each rectangular area, from the object data; e) means for supplying object data for each rectangular area from the respective portion of the memory and, if the rectangular area contains objects also falling in at least one other rectangular area, also from the global list, to the deriving means; and f) means for storing the image data and shading data derived by the deriving means, for display.

By allocating a portion of the memory as a global list, it means that object data for objects falling in more than one rectangular area only needs to be written to memory once. This reduces the amount of memory required and also reduces the time taken to store such object data.

Preferably, the at least one portion of the memory allocated to each rectangular area and the at least one portion of memory allocated as the global list, are allocated from unused portions of the memory according to requirements, such that the size and location of the at least one portion of the memory allocated to each rectangular area and the size and location of the at least one portion of the memory allocated as the global list, dynamically change as features c), d) and e) perform their functions.

Preferably, the deriving means comprises means for deriving depth data for each rectangular area from the object data and shading means for deriving the image data and shading data from the depth data.

Advantageously, the global list is arranged to store object data pertaining to objects falling in more than one rectangular area and also object data pertaining to objects falling in a single rectangular area but close to the boundary with another rectangular area. This improves processing for elementary areas falling close to the boundary between macro-tiles.

However, in that case, it is necessary to decide which object data will be stored in the global list and which will be stored in the portion allocated to the appropriate rectangular area. In one embodiment, on either side of a boundary between rectangular areas, the number of consecutive elementary areas containing objects falling in a single rectangular area increases as the distance from the boundary increases, and the object data for objects falling between the boundary and the elementary area at which the number of consecutive elementary areas containing objects falling in a single rectangular crosses a predetermined threshold, are stored in the global list. The threshold can be determined by a number of factors including the number of objects in the scene.

According to the second aspect of the invention, there is also provided a method for managing memory in a system for generating 3-dimensional computer images comprising the steps of: a) subdividing the image into a plurality of rectangular areas; b) storing object data pertaining to objects in the image which fall in each rectangular area in a memory by i) allocating at least one portion of the memory to each rectangular area and storing in that portion object data pertaining to objects in the respective rectangular area, and ii) allocating at least one portion of the memory as a global list and storing in the global list object data pertaining to objects falling in more than one rectangular area; c) supplying object data for each rectangular area from the respective portion of the memory and, if the rectangular area contains objects also falling in at least one other rectangular area, also from the global list, to deriving means for deriving image data and shading data for each rectangular area; c) deriving the image data and shading data in the deriving means; and e) storing the image data and shading data for display.

There are two advantages to allocating a portion of the memory as a global list. Firstly, object data is only stored once, which reduces the amount of memory required. Secondly, because the object data is only stored once, it means that object data for objects falling in more than one rectangular area only needs to be written to memory once i.e. to the global list rather than to each macro-tile portion of memory.

Preferably, at least one portion of the memory allocated to each rectangular area and the at least one portion of memory allocated as the global list, are allocated from unused portions of the memory according to requirements, such that the size and location of the at least one portion of the memory allocated to each rectangular area and the size and location of the at least one portion of the memory allocated as the global list, dynamically change as steps c), d) and e) are performed.

Preferably, step e) of deriving the image data and shading data in the deriving means comprises deriving depth data for each rectangular area from the object data and deriving the image data and shading data from the depth data.

Preferably, once the image data and shading data has been derived for a particular rectangular area, the at least one portion of the memory allocated to that rectangular area is marked as free and, once the image data and shading data has been derived for all the rectangular areas, the at least one portion of the memory allocated as the global list is marked as free. Because the global list is not marked as free until the image data and shading data has been derived for all the rectangular areas, a compromise must be made between a larger global list which reduces the amount of repetition of data but takes a long time until it can be marked as free and a smaller global list which can be marked as free relatively quickly but doesn't reduce the amount of data repetition as much.

Preferably, the global list is arranged to store object data pertaining to objects falling in more than one rectangular area and object data pertaining to objects falling in a single rectangular area but close to the boundary with another rectangular area.

In that case, preferably on either side of a boundary between rectangular areas, the number of consecutive elementary areas containing objects falling in a single rectangular area increases as the distance from the boundary increases, and the object data for objects falling between the boundary and the elementary area at which the number of consecutive elementary areas containing objects falling in a single rectangular crosses a predetermined threshold, are stored in the global list.

Aspects described in relation to the method of the second aspect of the invention may also be applicable to the system of the second aspect of the invention, and aspects described in relation to the system of the second aspect of the invention may also be applicable to the method of the second aspect of the invention.

According to a third aspect of the invention, there is provided a memory for use with a system for generating 3-dimensional computer images, the image to be generated being divided into a plurality of rectangular areas and each rectangular area being divided into a plurality of smaller areas, the memory comprising: a portion for storing object data for objects falling in each rectangular area; a portion for pointers from each smaller area to the object data for objects falling in that smaller area; objects in the image to be generated being divided into triangles, the object data comprising triangle data, vertex data and pointers between the triangle data and the vertex data; the memory being arranged such that, when the system processes a smaller area to generate the portion of the image in that smaller area, the system is able to fetch the vertex data for that smaller area in one fetch by using the pointer from each smaller area to the triangle data for objects falling in that smaller area, and the pointer between that triangle data and the vertex data.

According to a fourth aspect of the invention, there is provided a method for generating 3-dimensional computer images, the method comprising the steps of: a) subdividing the image into a plurality of rectangular areas MTn; b) providing a memory having, at any one time, a first portion or portions for storing object data and a second portion or portions for storing depth data, derived from the object data; c) loading object data for each rectangular area MTn into the first portion or portions of memory, each rectangular area MTn using a respective block Pn of the first portion or portions of the memory, until the total size of the first portion or portions of the memory used exceeds a predetermined threshold; d) selecting a block Pn of the first portion or portions of memory, deriving depth data for the respective rectangular area MTn from the object data of MTn, and storing the derived depth data for MTn in the second portion or portions of memory, the block Pn selected being such that, after step d) is performed, it is possible to either i) load further object data into the block Pn to replace all or part of the existing contents or ii) select a further block Pm of the first portion or portions of memory and derive depth data for the respective rectangular area MTm from the object data of MTm and store the derived depth data for MTm in the second portion or portions of memory; e) if i) at step d) is satisfied, repeating steps c) and d) until there is no further object data to load into the memory or, if ii) at step d) is satisfied, repeating step d) until there is no further object data to load into the memory; f) deriving image data and shading data for each rectangular area MTn from the depth data for each rectangular area MTn stored in the second portion or portions of memory; and e) storing the image data and shading data, for display.

Once the process becomes serialised because the amount of the first portion or portions of the memory used exceeds a predetermined threshold after step c), the selection of rectangular area at step d) becomes very important because it must be possible after that rectangular area is selected to EITHER load further object data OR derive further depth data and store it.

Note that the portion or portions allocated to the object data are not fixed since the amount of memory required for object data will change as the steps of the method are performed. If there is, at a particular time, more than one portion of the memory allocated to object data, the portions may be adjacent in the memory or may be interspersed with other portions of the memory allocated for different purposes. Similarly, the portion or portions allocated to the depth data are not fixed since the amount of memory required for depth data will changes as the steps of the method are performed. If there is, at a particular time, more than one portion of the memory allocated to depth data, the portions may be adjacent in the memory or may be interspersed with other portions of the memory allocated for different purposes.

The predetermined threshold at step c) may be 100% full or another threshold e.g. 75% full. It is possible for step d) to be commenced as the threshold is approached in order to maintain parallel processing as long as possible.

Preferably, the first portion or portions of the memory and the second portion or portions of the memory are allocated from unused portions of the memory according to requirements, such that the size of the first and second portion or portions and the location of the first and second portion or portions, within the memory, dynamically change as the steps of the method are carried out.

Preferably, a second portion or portions are always reserved for depth data, so that, if there is object data stored in the first portion or portions of the memory, it is always possible for step d) to be performed.

In that case, the reserved second portion or portions of memory may be at least sufficient for depth data for each elementary area of one rectangular area to be stored. Alternatively, the reserved second portion or portions of memory may be at least sufficient for depth data for each elementary area of two rectangular areas to be stored.

That reserved portion is a minimum to allow processing to continue. Preferably more of the second portion or portions is available for new depth data. This improves processing.

In one embodiment, step c) comprises loading object data for each rectangular area MTn into the first portion or portions of the memory, object data for objects falling in only one rectangular area being stored in a respective block Pn of the first portion or portions of the memory and object data for objects falling in more than one rectangular area being stored in a block PGl of the first portion or portions of the memory.

In one embodiment, at a particular point, the memory allocated to each block Pn may be equal. In that case, if, after step c), the blocks of memory Pn are the same size for each rectangular area MTn, step d) is performed for each rectangular area before further object data can be loaded into the first portion or portions of the memory.

More usually, however, the memory is not evenly allocated to each block Pn. In that case, if, after step c), the blocks of memory Pn are not the same size for each rectangular area MTn, the block Pn of the first portion or portions of memory selected at step d) is the largest block Pn.

According to a fifth aspect of the invention, there is provided a memory management system for use with systems for generating 3-dimensional computer images in a plurality of applications running concurrently, the system comprising: a) means for subdividing the image of each application into a plurality of rectangular areas; b) at least one memory for storing object data and depth data derived from the object data for each rectangular area for each application; c) means for storing the object data of each application in the at least one memory; d) means for deriving the depth data for each rectangular area, from the object data, for each application; e) means for storing the depth data for each rectangular area for each application in the at least one memory; f) means for loading further object data for each application into the at least one memory, to replace the existing contents for the respective application; g) means for retrieving the stored depth data for each application; h) means for deriving updated depth data for each picture element of each rectangular area for each application from the new object data and the stored depth data for the respective application, and storing the updated depth data for each application to replace the previously stored depth data for the respective application; i) means for causing features e), f), g) and h) to repeatedly perform the functions until there is no further object data for any application to load to the at least one memory; j) means for deriving image data and shading data from the depth data, for each application, for display; and k) means for storing and updating the progress made by features c), d), e), f), g), h) and i) for each application.

Thus, one system is able to run more than one application at the same time. By virtue of feature k) the system can keep track of the internal state for each application.

In one embodiment, the at least one memory comprises one memory for each application.

In that embodiment, each memory may comprise a first portion or portions for storing object data for each rectangular area of the respective application and a second portion or portions for storing depth data derived from the object data of the respective application.

In that embodiment, preferably, the first portion or portions of the memory and the second portion or portions of the memory are allocated from unused portions of the memory according to requirements, such that the size of the first and second portion or portions and the location of the first and second portion or portions, within the memory, dynamically change as the features c), d), e), f), g), h) and i) perform their functions.

In that embodiment, preferably a second portion or portions are always reserved for depth data of the respective application, so that, if there is object data stored in the first portion or portions of the memory, it is always possible for features d) and e) to perform their functions.

In an alternative embodiment, the at least one memory comprises a single memory, portions of which are allocated to each application as required. This is a more efficient way to use the memory so that the total memory required can be reduced.

In that embodiment, preferably a portion of the single memory is always reserved for depth data so that, if there is object data stored in the memory, it is always possible for features d) and e) to perform their functions.

In that case, preferably, the reserved portion is sufficient for depth data for each elementary area of one rectangular area to be stored, irrespective of the number of applications.

According to the fifth aspect of the invention, there is also provided a method of generating 3-dimensional computer images in a plurality of applications running concurrently, the method comprising, for each application, the steps of: a) subdividing the image into a plurality of rectangular areas; b) providing at least one memory for storing object data and depth data derived from the object data for each rectangular area; c) storing the object data in the at least one memory; d) deriving the depth data for each rectangular area, from the object data; e) storing the depth data for each rectangular area in the at least one memory; f) loading further object data for each application into the at least one memory, to replace the existing contents; g) retrieving the stored depth data; h) deriving updated depth data for each picture element of each rectangular area from the new object data and the stored depth data, and storing the updated depth data to replace the previously stored depth data; i) causing steps e), f), g) and h) to perform repeatedly until there is no further object data top load to the at least one memory; and j) deriving image data and shading data from the depth data, for display; wherein the steps of the method are performed by one system, for all the plurality of applications, the system sharing its time between the plurality of applications and storing and updating the progress of steps c), d), e), f), g), h) and i) for each application.

Aspects described in relation to the method of the fifth aspect of the invention may also be applicable to the system of the fifth aspect of the invention, and aspects described in relation to the system of the fifth aspect of the invention may also be applicable to the method of the fifth aspect of the invention.

Aspects described in relation to one aspect of the invention may also be applicable to another aspect of the invention.

BRIEF DESCRIPTION OF THE DRAWINGS

Existing systems have already been described with reference to FIGS. 1 and 2, of which.

Figure 3:
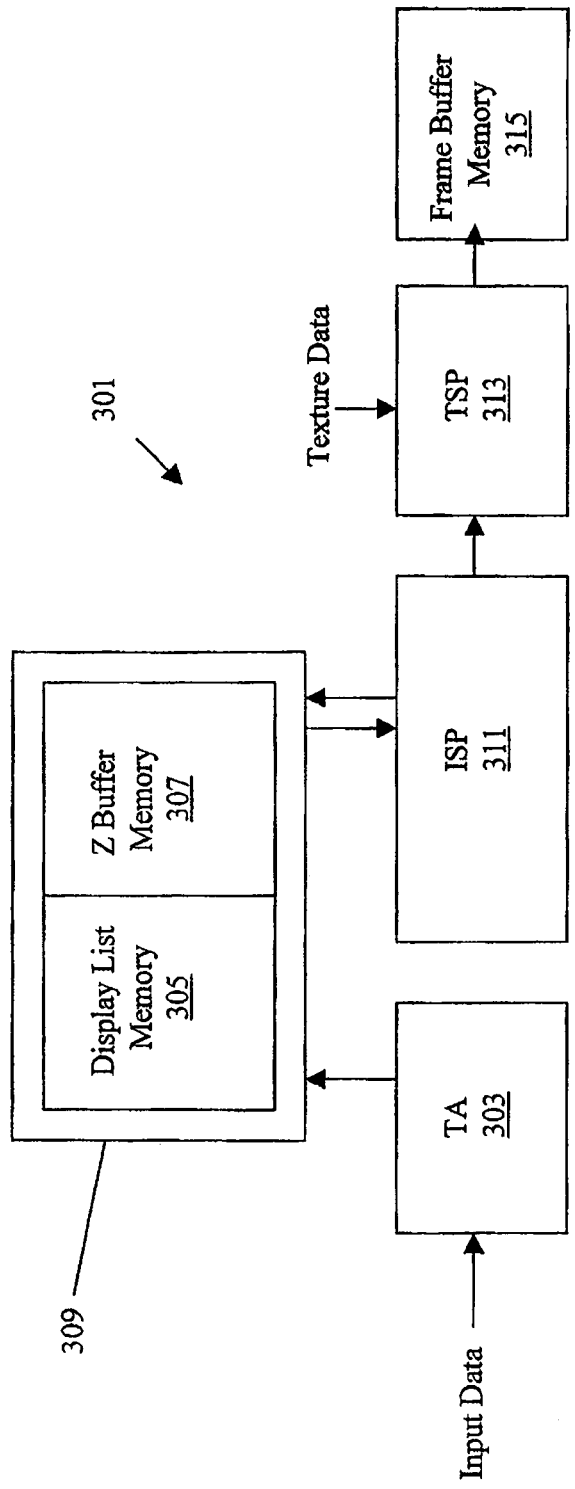
Figure 4:
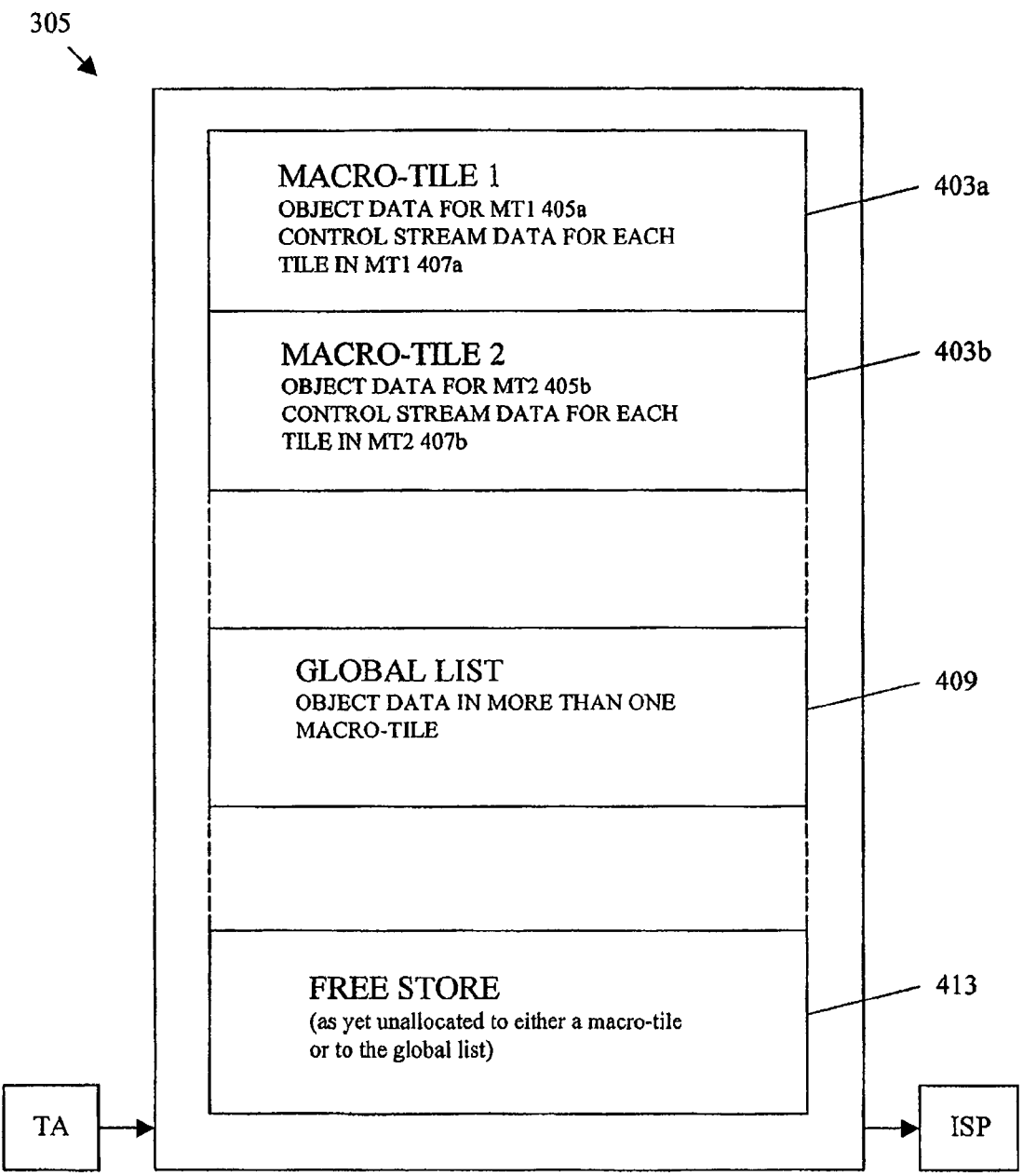
Figure 5:
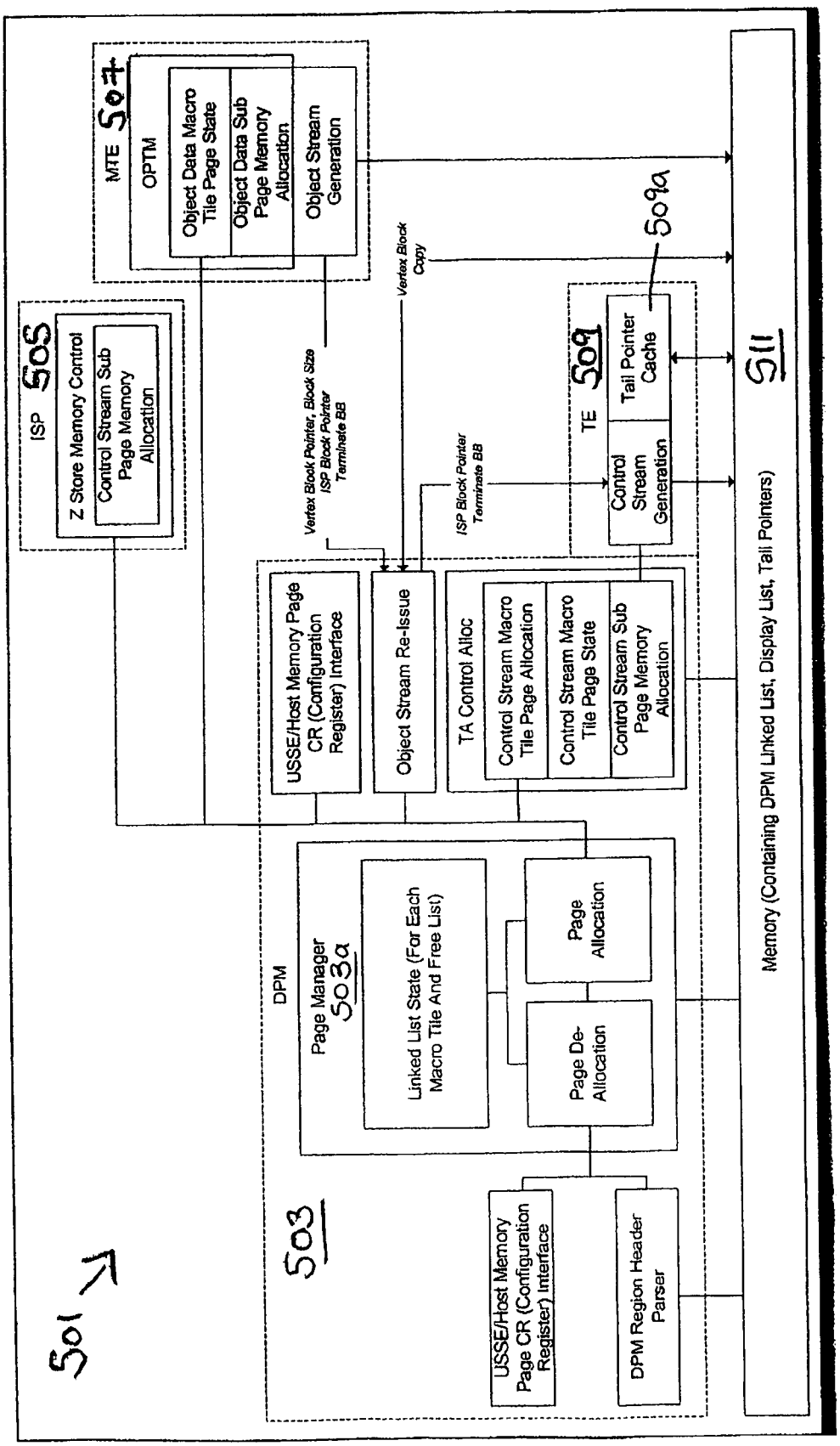
Figure 8A:
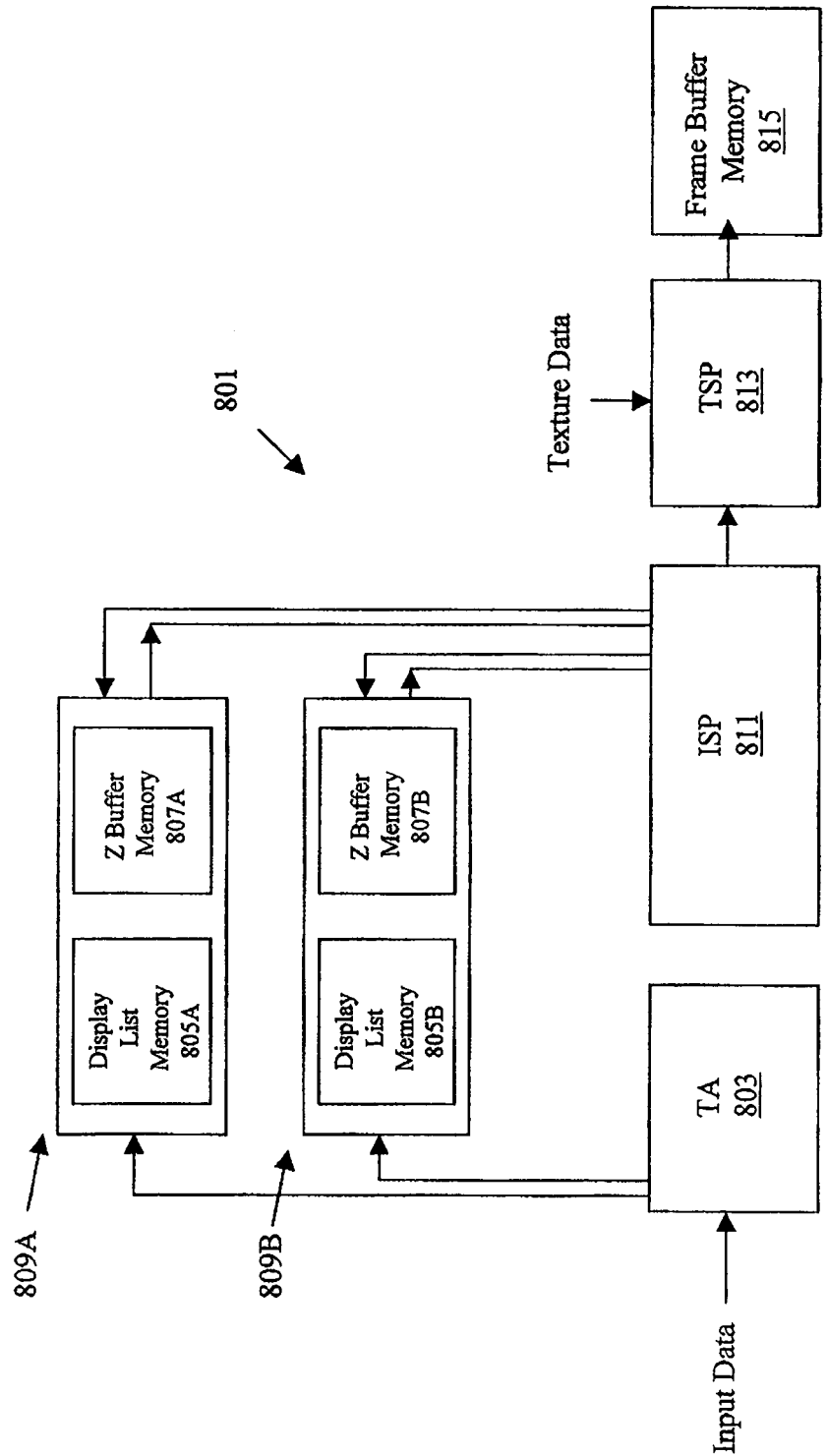
Figure 8B:
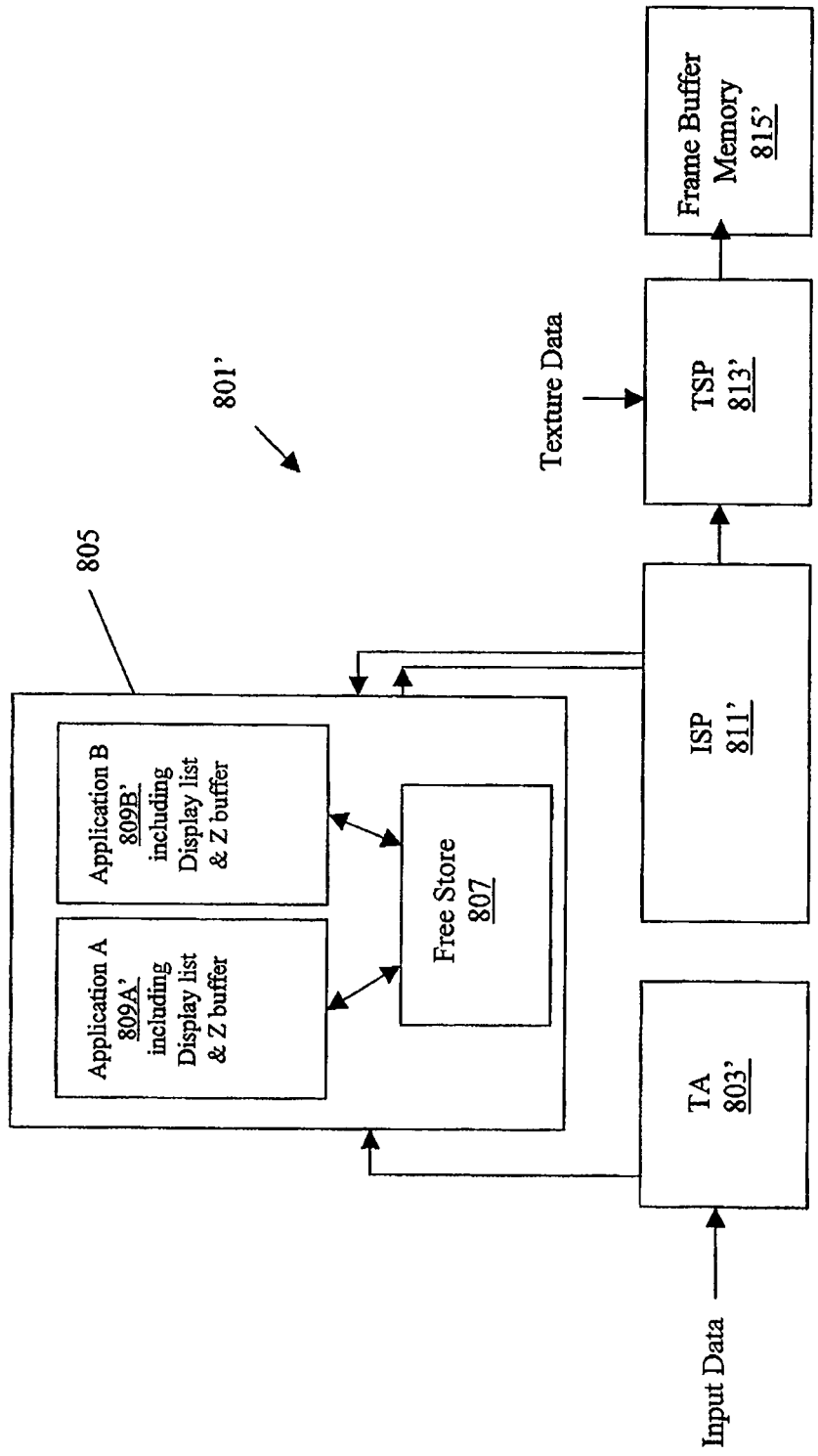

An embodiment of the invention will now be described with reference to the remaining figures, of which:

FIG. 3 is a schematic view of a rendering and texturing system according to an embodiment of the invention;

FIG. 4 is a schematic view of the display list memory according to an embodiment of the present invention;

FIG. 5 is a schematic view of one possible arrangement of the Dynamic Parameter Management (DPM) System;

FIG. 6 comprising FIGS. 6a to 6f shows the rendering process for a first embodiment, in which the memory is evenly allocated to the macro-tiles;

FIG. 7 comprising FIGS. 7a to 7g shows the rendering process for a second embodiment, in which the memory is unevenly allocated to the macro-tiles;

FIG. 8a is a schematic view of a rendering and texturing system according to an embodiment of the invention, the system being arranged to run two concurrent applications; and FIG. 8b is a schematic view of a rendering and texturing system according to an alternative embodiment of the invention, the system being arranged to run two concurrent applications.

DETAILED DESCRIPTION OF A PREFERRED EMBODIMENT

FIG. 3 is a schematic view of a rendering and texturing system according to an embodiment of the invention. It can be seen that the system 301 is similar to that of FIG. 2 and includes a TA 303, ISP 311, TSP 313 and Frame Buffer 315. In this case, however, the Display List Memory 305 and the Z Buffer Memory 307 are both part of a single heap of memory, termed the Parameter Memory 309. Allocation between the Display List and the Z Buffer within the parameter memory is discussed below. FIG. 3 does not show a z compression/decompression unit, as in FIG. 2, but such a unit could be included.

FIG. 4 is a schematic diagram of the display list memory according to an embodiment of the invention. The display list 401 comprises control stream and object data, which will be discussed in more detail below.

As before, tiles on the visible screen are grouped together into macro-tiles, each macro-tile being an area of the screen consisting of a number of tiles. The boundaries of the macro-tiles are defined by configuration registers. In one embodiment there are four macro-tiles. In another embodiment, there are sixteen macro-tiles. Indeed, there may be any number of macro-tiles and the macro-tiles need not necessarily be of the same shape and size (although the processing can potentially become more complicated if they are not). The macro-tile size is designed to offer sufficient granularity for memory recycling, whilst not incurring an overly high cost of the infrastructure. Larger macro-tiles result in lower memory usage and less on-chip storage, whilst smaller macro-tiles allow the memory to be recycled more quickly increasing the memory efficiency.

As can be seen in FIG. 4, macro-tiles 403a, 403b contain both the control stream 405a, 405b and object data 407a, 407b for the group of tiles. Each object in the tile is stored as a number of triangles having surfaces and vertices. The object data is stored in a vertex block which stores data on each triangle in the macro-tile and each vertex in the macro-tile. The object data is written only once for a macro-tile. Control stream data is rather like the object pointers of PCT/GB01/02536. It provides a pointer from the section of memory allocated to a particular tile to the object parameters for objects appearing in that tile. Thus, control stream data exists for every tile in a macro-tile. This saves duplicating surface data for objects that appear in several tiles. As a particular tile is being rendered, the control stream data allows the appropriate object data (triangle data and vertex data) to be fetched from the vertex block. In known arrangements, it was necessary to fetch the triangle data for a particular tile, then determine the vertices of that triangle, then fetch the appropriate vertex data, before the ray/intersection procedure could be performed for rendering.

However, in this embodiment of the invention, links are provided between the triangle data and the appropriate vertex data in the vertex block. Thus, the appropriate vertex data can be fetched directly. This is an improvement because only one fetch has to be performed rather than two. Also, a reduced amount of data may need to be fetched, since one vertex may relate to more than one triangle. In one particular embodiment, a vertex block contains up to 32 vertices, 64 triangles.

In FIG. 4, we see that, as well as a block of display list memory for each macro-tile that requires it from the free store 413, there is also a global list 409. It is possible for object data to traverse more than one macro-tile. In this case, the object data 411 is allocated to the global list, which contains only object data that is in more than one macro-tile. The display list is thus grouped into macro-tiles plus a global list. All object and control stream data within a macro-tile will only be addressed by tiles that reside within a given macro-tile and any object data residing in more than one macro-tile is in the global list and this data can be addressed from any control stream.

It should be noted that, although the memory in FIG. 4 is shown as having the macro-tile blocks at one end of the memory, followed by the global list, followed by the free store, this is simply schematic and should not be interpreted as indicating how the memory is divided up. In actual fact, blocks of global list and blocks of the various macro-tiles may be interspersed in the memory according to when they become required. Any non-allocated portions of the memory remain in the free store. Thus, the amount of memory allocated to a particular function and the location of that memory within the display list are both varying dynamically.

In an improved version, the global list contains further object data, not simply object data that falls within more than one macro-tile. Typically, the system uses a pipeline processor, with a number of cells, adjacent cells working on adjacent pixels. As the boundary between macro-tiles is approached, there may be some objects that fall just in one macro-tile mixed with objects that fall in both macro-tiles on either side of the boundary. Thus, the ISP will need to switch between reading from the macro-tile block allocated to the macro-tile on one side of the boundary and the global list and, depending on the arrangement of objects may need to switch several times as the boundary is crossed. To avoid this, it makes sense to store object data for any objects close to the boundary in the global list, even if those objects only fall in one macro-tile. This is to prevent the ISP having to switch many times between reading from the macro-tile block and reading from the global list. Thus, the global list stores object data for objects falling in more than one macro-tile but also object data for objects falling in only one macro-tile but close to the boundary with another macro-tile.

Well away from the boundary, all the objects fall in only that macro-tile so the ISP can simply read from the appropriate macro-tile block of memory. As the boundary is approached, some pixels require the ISP to read from the global list. A decision on whether to store the object data in the macro-tile block of memory or in the global list is made based on the number of adjacent pixels that contain objects in only one macro-tile. As the boundary is approached, the number of consecutive pixels that contain objects that fall in only one macro-tile will decrease. When that number of consecutive pixels falls below a predetermined number, a decision is made to store subsequent object data (i.e. between that pixel and the boundary) in the global list, even though those objects may fall in only that macro-tile. Similarly, as the boundary is left, the number of consecutive pixels that contain objects that fall in only one macro-tile will increase. When that number of consecutive pixels rises above the threshold, subsequent object data is then stored in the appropriate macro-tile block of memory rather than in the global list.

The previous arrangement, described in PCT/GB01/02536 does not include a global list, but simply includes a block of memory allocated to each macro-tile. Although this allows all the memory associated with a particular macro-tile to be released after that macro-tile has been rendered, without affecting the display lists of other macro-tiles, it means that there is quite a lot of duplication of data, particularly when there are large objects which cover a large number of macro-tiles. With the global list, all the macro-tiles need to be rendered before the global list can be freed up, but the advantage of the global list is that such duplication can be largely avoided, reducing the memory consumption. Also, because object data for objects falling in more than one macro-tile only has to be written to the memory once, to the global list, rather than once for each macro-tile, the amount of time taken to store such object data is reduced.

For example, when the screen is divided into four macro-tiles, as much as 50% of the memory may be allocated to the global list for some scenes. The minimum amount of memory for the global list should be similar to the memory used for the macro-tiles. However, the global list memory should be limited as much as possible because, as mentioned, it is not possible to recover this memory from the scene without rendering all the macro-tiles in the scene. This will be discussed further below.

As can be seen in FIG. 4, the data in the display list is grouped by locality so that memory can be allocated to each macro-tile as required and released once this macro-tile has been rendered. Once all macro-tiles have been rendered, the global list space can also be released.

According to an embodiment of the invention, the display list memory is managed by a Dynamic Parameter Management (DPM) System. During the tiling phase, memory is allocated to the system and during the rendering phase, this memory is de-allocated. The DPM system manages the memory allocation and de-allocation during these phases and, in the event of no memory being available, works to schedule data to be rendered, which frees more memory. It is therefore always possible to tile and render a scene's worth of vertex data.

One possible arrangement of the DPM system is shown in FIG. 5. The DPM System 501 comprises a Dynamic Parameter Manager DPM 503, the ISP 505, the Macro-Tiling Engine MTE 507, the Tiling Engine TE 509 and the memory 511. The MTE 507 generates the object data for each macro-tile and enters that in the appropriate block of memory 511. Thus the MTE 507 controls the object data part of the display list memory. The TE 509 uses the object data from MTE 507 to generate the control stream data for each tile and enters that in the memory 511. Thus the TE 509 controls the control stream part of the display list memory. In order to keep track of the consumption of control stream memory, the TE 509 includes a tail pointer cache 509a, discussed below. The ISP 505 uses the object data to derive depth data and store that in the z buffer part of the memory 511.

The process of memory allocation and de-allocation will now be described with reference to FIG. 5. These two operations are performed asynchronously, allocating and de-allocating from an internal heap of parameter memory.

The DPM maintains a page manager 503a which stores a linked list state and allocates and de-allocates blocks of memory. The linked list state allows a particular block of memory to be associated with a macro-tile so that, when that macro-tile is rendered, the correct block of memory is freed up. This is shown at 503a of FIG. 5. The DPM also keeps track of the internal state of the TA, ISP and TSP i.e. the current state of the object data, depth data, image data and shading data, which is dependent on how much of the scene has been loaded to the display list and how much has been rendered so far. As the TA hardware processes object data and control stream data through separate parts of the pipeline, it is allocated separately to these two structures. The DPM is only interested in allocating and de-allocating pages to the MTE and TE. Once allocated, it is no longer interested in that page; all it needs to know is when an allocated page is finished with so that it can be de-allocated. For this purpose, flags are used to indicate when a partial render is complete and the page of memory allocated to that macro-tile can be released. Then, when all the macro-tiles have been rendered, a flag indicates that the global list page(s) can also be released.

In one particular embodiment, memory is allocated to a given macro-tile or to the global list, for object data, in 4096 byte chunks and this is consumed as required by the macro tiling engine which places object data into the macro tiles. The Tiling Engine takes the macro-tiled object data and creates the control stream data for each tile. Initially, a 4096-byte page of memory is allocated to a macro-tile for the control stream. Memory from this page is then allocated to control stream data for a given tile (within the macro-tile) as required by the Tile Accelerator. Control Stream Data is allocated in 16 32-bit word blocks. When an allocated page is fully used, a new page is allocated to the macro-tile or to the global list by the DPM. In this embodiment, where the first page of control stream data is 4096 bytes and there are 16 4-byte words for each tile, the allocated page is full up after storing control stream data for 64 tiles. Because the control stream data is allocated in blocks of 16 words (in this example), there is a separate tail pointer cache 509a that keeps track of the consumption of this control stream memory. The tail pointer cache contains the address of the next available control stream. When a block is fully consumed (in the example above after 64 tiles), a new control stream block is allocated and this is updated into the tail pointer cache 509a.

When a rendering process takes place, memory is de-allocated. As macro tiles are completed, the DPM adds the pages allocated to that macro tile back into the free store. Due to the linked list structure, this involves writing the head of the macro-tile list value to the tail address of the free store list, and updating the free list tail address to the macro tile free list address.

In previous systems, once a scene was tiled, it could be rendered. Thus, the tiling (by the TA) and rendering (by the ISP) were taking place in series. Now, with the partial rendering, the ISP and TA have to be operating at the same time on the same data i.e. in parallel. In order to achieve this, without corrupting the memory allocation lists, we fool the TA and ISP into thinking that they are handling different pieces of data. This is done by double buffering the head and tail information for each macro-tile and for the global list. This means that the TA can operate on the data at the same time as the ISP, because they are each pointed to separate head and tail information.

Ideally, the ISP and TA are operating in parallel and there is always enough memory to allocate memory to the TA as required. However, in some cases (where the macro-tiles are small or the image is very complex, for example), there may not be enough memory to allocate immediately.

If a TA allocation is not possible, the system checks to see if a render is in progress. If it is, the system keeps trying to allocate the memory, as it steadily becomes available because of the render. Once enough memory is freed up by the rendering, the TA allocation will succeed.

Eventually, all pending renders will be completed and the DPM will have to perform render management i.e. select a macro-tile to render, before more allocation can take place.

Thus, in the process, there is a steady decline in performance as the available memory space decreases. The process eventually becomes serialised as the amount of memory space declines and, at this stage, the selection of macro-tile on which to perform a partial render is very important. In PCT/GB01/02536, once the display list memory filled up to a certain threshold, a macro-tile was selected to render in order to free up more memory. It was suggested that we might select the macro-tile to render according to the amount of memory that might be freed up. An improved method for selecting which macro-tile to render will now be described.

As discussed above, the z buffer memory and the display list memory are both contained in a single heap of memory, the parameter memory. How the z buffer and display list are allocated will be described with reference to FIGS. 6 and 7.

The hardware reserves part of the parameter memory as z buffer, the z buffer being equivalent to at least the size of a macro-tile i.e. sufficient memory so that depth data can be stored for each pixel of a macro-tile. This is so that, in the event of running out of memory, there is always some reserved memory remaining in order to carry out a partial render.

To be able to recover from any partial renders caused by insufficient memory, the entire parameter memory should be greater than the z buffer memory. The minimum amount of total parameter memory should equal the total z buffer memory plus space for one further macro-tile. Thus, even when partial renders have been carried out on all the macro-tiles (so that the z buffer is full), we can still insert more object data for a further macro-tile into the display list memory. If the memory required for the z buffer is 1 unit (0.25 units for each macro-tile), the minimum parameter memory required is 1 plus 0.25 i.e. 1.25 units.

For example, if the screen size is 1024 by 1024 pixels, and the format of the z buffer is 32 bits per pixel, and the screen is divided into 4 macro-tiles, a total z buffer of about 4 MB will be required. Thus, the total parameter memory must be about 5 MB (i.e. 4 MB plus 1 further MB for another macro-tile). Or, if the screen size is 2048 by 2048 pixels, and the format of the z buffer is 32 bits per pixel, and the screen is divided into 16 macro-tiles, a total z buffer of about 16 MB will be required. Thus, the total parameter memory must be about 17 MB (i.e. 16 MB plus 1 further MB for another macro-tile).

Figure 1:
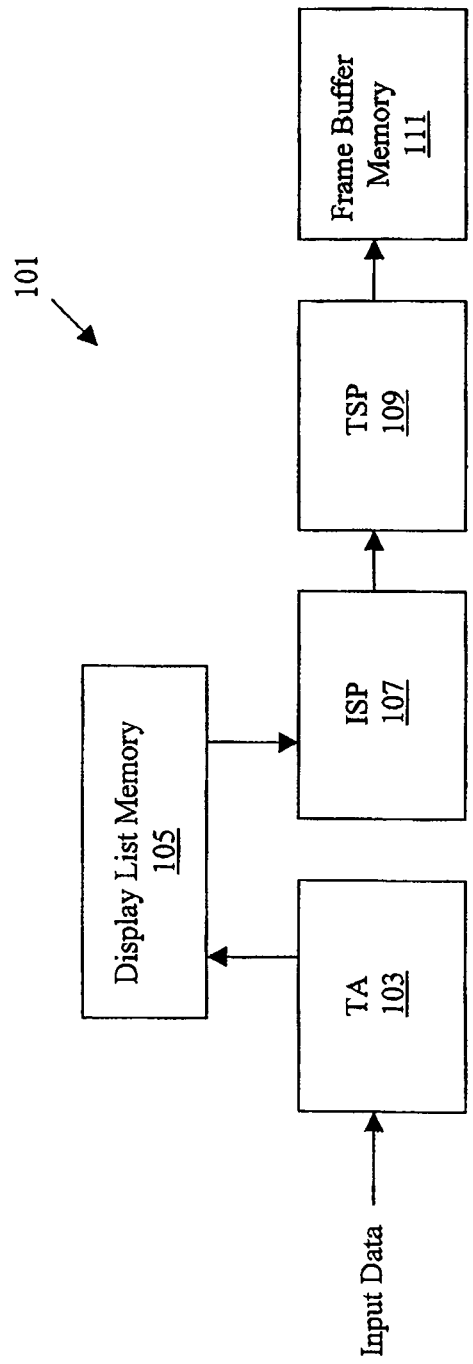
FIG. 1 is a schematic view of a first known rendering and texturing system.
Figure 2:
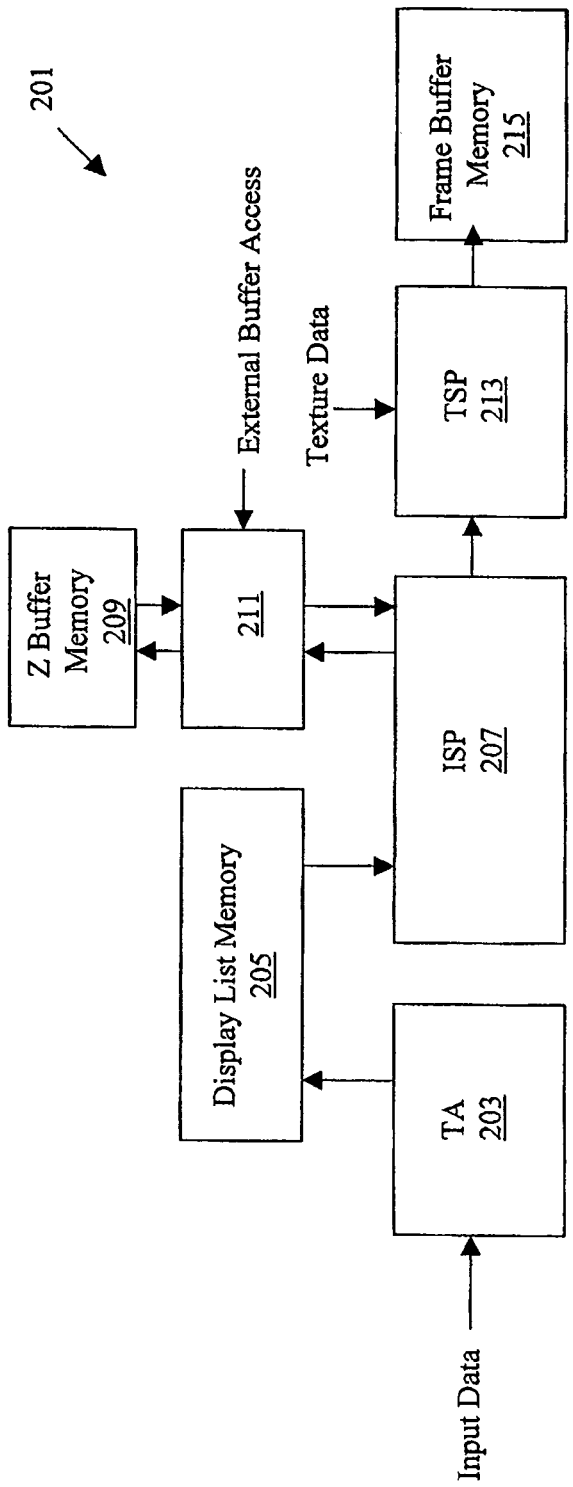
FIG. 2 is a schematic view of a second known rendering and texturing system, which provides an improvement over that of FIG. 1.

(In the prior art arrangement illustrated in FIG. 2, compression was performed before storing in the z buffer and decompression was performed when reading from the z buffer. If such a compression/decompression unit were used in this invention, we would actually need to reserve z buffer equivalent to two macro-tiles. This is because, as new depth data is stored, there has to be space to compress that data before the previous depth data is decompressed. It has been found that, in that case, two macro-tiles worth (rather than one) of z buffer must always be reserved.)

The selection of macro-tile to render is based on the need that, after that partial render, it must be possible to EITHER insert new object data for a macro-tile OR perform another partial render. If one of these is not satisfied, the system blocks and no further processing can be done. Thus, the macro-tile to render is selected carefully.

Two examples of macro-tile selection are now given.

EXAMPLE 1

FIGS. 6A to 6F

Figure 6A:
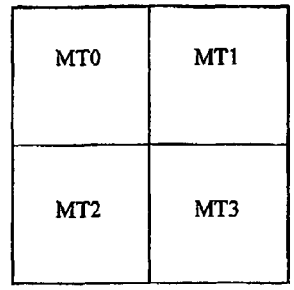
Figure 6B:
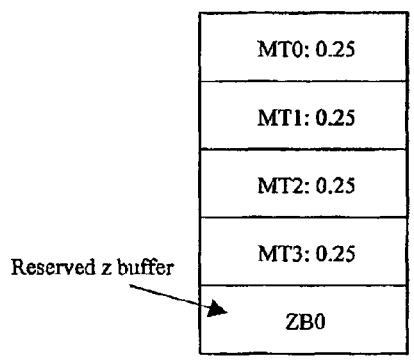
Figure 6C:
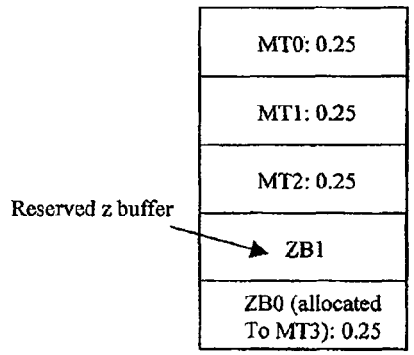
Figure 6D:
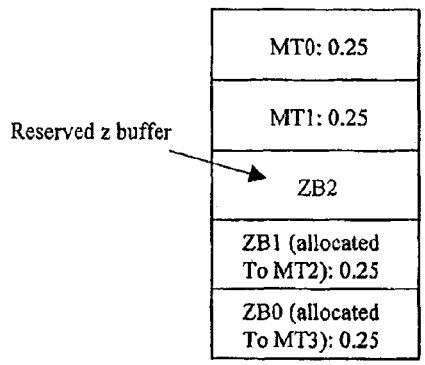
Figure 6E:
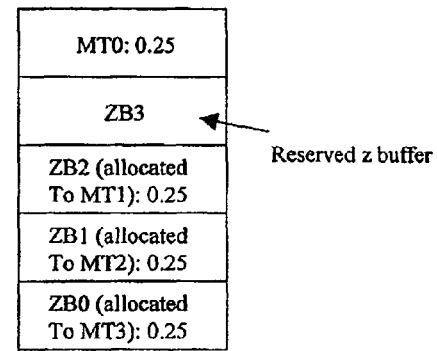
Figure 6F:
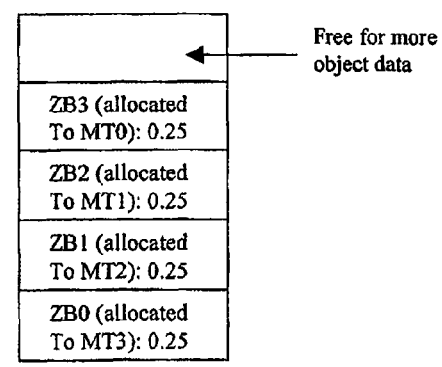

In this first example, the memory is allocated evenly to each macro-tile. There are four macro-tiles on the visible screen, as shown in FIG. 6a. The allocation of memory for these macro-tiles is shown in FIGS. 6b to 6f.

At the outset, all the memory is allocated, 0.25 units to each macro-tile. A z buffer portion (equal to the size of one macro-tile—0.25) is reserved—ZB0. This is shown in FIG. 6a.

The reserved z buffer ZB0 can be used for a partial render of one of the macro-tiles. It does not matter which one since they are all using the same amount of memory space. A partial render is performed on macro-tile MT3. This gives the result shown in FIG. 6b. Macro-tile MT3 is freed up by partial rendering to ZB0, but we then must reserve that freed up space for more z buffer—ZB1. So, there is no free space to insert new object data, but we can perform another partial render using ZB1.

So, the reserved z buffer ZB1 can be used for a partial render of another macro-tile, this time MT2. A partial render is performed which gives the result shown in FIG. 6c. Macro-tile MT2 is freed up by partial rendering to ZB1, but we then must reserve that freed up space for more z buffer—ZB2. So, there is no free space to insert new object data, but we can perform another partial render using ZB2.

So, the reserved z buffer ZB2 can be used for a partial render of another macro-tile, this time MT1. A partial render is performed which gives the result shown in FIG. 6d. Macro-tile MT1 is freed up by partial rendering to ZB2, but we then must reserve that free up space for more z buffer—ZB3. So, there is still no free space to insert new object data, but we can perform another partial render using ZB3.

So, the reserved z buffer ZB3 can be used for a partial render of the final macro-tile MT0. A partial render is performed which gives the result shown in FIG. 6e. Macro tile MT0 is freed up and we need not reserve any more z buffer since all the macro-tiles now have z buffer allocated.

So, we can use the free space to insert more object data for one of the tiles. Then we can partial render, then we can insert more object data and so on, until the scene is finished, at which point the parameter memory and z buffer memory can be de-allocated.

Thus, because the memory is evenly allocated at the outset to the four macro-tiles, all the tiles must be rendered before more object data can be inserted. As an optimisation, if the system sees at any stage that the memory is evenly distributed to all the macro-tiles, it can immediately render all macro-tiles.

The case illustrated in FIG. 6 is the worst case scenario since the maximum memory that can be freed up by a partial render is 0.25 units. In any other case, where the memory is not allocated evenly to the macro-tiles, a partial render can always free up more memory space.

EXAMPLE 2

FIGS. 7A to 7G

In the second example, the memory is allocated unevenly to the macro-tiles. In this case, the macro-tile with the most amount of memory allocated to it will be chosen for rendering when the memory is full up. This is a more usual case and is illustrated in FIGS. 7a to 7g. It should be noted that FIG. 7a illustrates the macro-tiles on the screen whereas FIGS. 7b to 7g illustrate the memory usage for each of the macro-tiles. The macro-tiles on the image are equal in size, but their memory allocation differs depending on the amount of object data in each macro-tile.

At the outset, all the memory is allocated, 0.4375 units to macro-tile MT2, 0.25 units to macro-tile MT0, 0.1875 units to macro-tile MT3 and 0.125 units to macro-tile MT1. A z buffer portion (equal to the size of one macro-tile on the screen 0.25) is reserved—ZB0. This is shown in FIG. 7b.

The reserved z buffer ZB0 can be used for a partial render of one the macro-tiles. Macro-tile MT2 is chosen since that has the greatest amount of memory allocated to it. Once the partial render is performed on macro-tile MT2, 0.25 units of the freed up space must be reserved as a z buffer—ZB1, but the remaining space is free for more object data. This is shown in FIG. 7c.

More object data for MT2 is then loaded into that free space until the memory is full up. This is shown in FIG. 7d.

The reserved z buffer ZB1 can then be used for a partial render of macro-tile MT1, since that macro-tile now has the greatest amount of memory allocated. Once the partial render is performed on MT1, the resulting freed up space must be reserved for more z buffer—ZB2. So, there is no free space to insert more object data. This is shown in FIG. 7e.

Since MT2 already has ZB0 allocated to it, another partial render can then be performed on MT2. This frees up 0.1875 of free space. Also, ZB2 can be used for a partial render of MT3. In total, this frees up 0.375 of space, 0.25 of which must be reserved as z buffer ZB3. This is shown in FIG. 7f.

At this stage, either the freed up space can be used for more object data for MT0, MT2 or MT3, in which case a partial render takes place using the z buffers allocated to MT0, MT2 and MT3. Or, the freed up space is used for more object data for MT1. In that case, ZB3 is used for a partial render of macro-tile MT1. This is shown in FIG. 7g. Macro-tile MT1 is freed up and we need not reserve any more z buffer since all the macro-tiles now have z buffer allocated.

The example illustrated in FIG. 7 is easier to deal with than the example of FIG. 6, because more than 0.25 units of memory is freed after the first partial render, since the macro-tiles do not have memory evenly allocated.

FIGS. 6 and 7 illustrate two examples of render management when the memory remaining is small so that the process effectively becomes serialised and the selection of macro-tile to render at each stage becomes very important. These two cases show that, with the minimum amount of z buffer always reserved i.e. equivalent to one macro-tile, the process can still continue.

We discussed previously that the global list memory should be limited as much as possible because it is not possible to recover this memory from the scene without rendering all the macro-tiles in the scene. The global list is limited to the extra memory allocated in addition to the minimum requirement of 1.25× the size of a z buffer discussed above. If this is 50% of the macro-tile memory, then the total minimum memory requirement is 1.75 the size of a z buffer (i.e. 1 unit for the display list memory, 0.25 reserved for the z buffer and 0.5 for the global list).

However, in order to be able to render an arbitrarily complex scene, the global object buffer must be recoverable, so this implementation enables this by allowing multiple macro-tiles split in terms of their global object list and then rendering all the macro-tiles in turn. The splitting is achieved, by creating a new context for all macro tiles and continuing to render into the new context. In parallel with this, the tiled data is processed and freed back into the system. This method allows both the de-allocation and allocation parts of the pipeline to remain active.

In a particular embodiment of the invention, the device supports up to 256 MB of parameter memory, divided into 4 kB pages or blocks and up to 16 macro-tiles plus a global list per scene.

The system described above may be used to run more than one application concurrently. For example, if you have two windows i.e. applications, open on your PC screen, the same hardware can be used to generate the image data for both applications. FIG. 8*a* shows a first arrangement for using the hardware of FIG. 3 to generate image data for two applications. FIG. 8*b* shows a second arrangement for using the hardware of FIG. 3 to generate image data for two applications. FIGS. 8*a* and 8*b* can quite easily be extended to more than two applications.

The system 801 of FIG. 8*a* comprises a TA 801, ISP 811, TSP 813 and Frame Buffer 815. In contrast to the system of FIG. 3, however, the TA 803 and ISP 811 have access to two separate memories. The first memory 809A is for the first application and comprises a Display List Memory 805A for the first application and a z Buffer Memory 807A for the first application. The second memory 809B is for the second application and comprises a Display List Memory 805B for the second application and a z Buffer Memory 807B for the second application.

The system operates in exactly the same way as the FIG. 3 arrangement described above. Allocation of the system to each application may be allocated by Time Divisional Multiplexing (TDM) or by another method.

The system 801' of FIG. 8*b* comprises a TA 801', ISP 811', TSP 813' and Frame Buffer 815'. In contrast to the system of FIG. 8*a*, however, the memories for the two applications are contained in one single heap of memory 805. This reduces the memory required. The single heap of memory 805 allocates the memory to each application as required. In FIG. 8*b*, some of the memory 809A' has been allocated to the first application. That portion of the memory 809A' includes display list memory and z buffer memory. Some of the memory 809B' has been allocated to the second application. That portion of the memory 809B' includes display list memory and z buffer memory. Memory not yet allocated remains in the free store 807.

The system of FIG. 8*b* also operates in exactly the same way as the FIG. 3 arrangement described above. Allocation of the system to each application may be allocated by Time Divisional Multiplexing (TDM) or by another method. Because the memory is allocated to each application as required, the memory is used more efficiently than in FIG. 8*a*.

In both examples described above, and indeed any case where the same hardware is used to run more than one application, the system must include some means of storing the internal state for each application. By internal state, we mean the current state of the TA and ISP for that application i.e. the object data, depth data, image data and shading currently stored. This provides a record of the progress made so for in storing the object data, rendering etc for a particular application. Thus, as the hardware is swapping between the several applications, it knows where to begin from when it reaches each application.

In the examples discussed previously, with only one application running, it was noted that, in order for it to be possible to generate an arbitrarily complex scene, it is necessary always to reserve sufficient memory for depth data for one macro-tile. So, how does this rule apply when there is more than one application running?

Consider, first, the example in FIG. 8*a* in which the memory for each application is separate. In that case, it is necessary for each application's memory to reserve z buffer for one macro-tile. That is, in total, for n applications running concurrently, there are n memories and a reserved portion of z buffer in each of those n memories.

Now consider the example in FIG. 8*b* in which the memories for the several applications are contained in a single heap of memory. In that case, it is necessary to reserve only z buffer for one macro-tile, irrespective of the total number of applications. This is because, only one partial render is ever taking place at a particular time, so the same reserved memory space can be used for all the applications. This is a further advantage of the FIG. 8*b* arrangement.

What is claimed is:

1. A system for use in rendering an image from 3-D graphics data comprising:
    a heap memory;
    a manager configured for reserving z buffer space, in the heap memory, to store Z buffer data for at least one macrotile of an image to be rendered, wherein each macrotile is defined to include a respective subset of pixels in the image, and for allocating blocks from a remaining portion of the heap memory to display lists for respective macrotiles; and
    a tiling accelerator comprising a macrotiling engine configured for inputting a stream of geometry elements, determining overlap between the inputted geometry elements and the macrotiles, and writing identifying information for the geometry elements to display lists according to the determined overlap, wherein data for each display list is written to a respective current memory block, allocated from the heap memory, to that display list,
    wherein the system is configured to determine, before the stream of geometry elements has been completely processed by the macrotiling engine, that a selected display list, associated with a macrotile, is to begin image synthesis processing, resulting in depth information that is written into blocks of memory from the reserved z buffer space, and to reallocate the memory used for storing the selected display list first to reserved z buffer space, at least until there is reserved z-buffer space for at least one macrotile, and if any blocks of memory remain from the memory used for storing the selected display list, then to make those blocks available for on demand allocation by the manager for storing further outputs produced by the tiling accelerator in processing additional geometry elements from the stream of geometry elements.

2. The system for use in rendering an image from 3-D graphics data of claim 1, wherein the manager is configured to divide a portion of the heap memory, remaining after the allocation of reserved z buffer memory, among the macrotiles, so that the entire heap memory is assigned either to reserved z buffer memory or to a macrotile.

3. The system for use in rendering an image from 3-D graphics data of claim 2, wherein the manager is configured to divide the portion of the heap memory, remaining after the allocation of reserved z buffer memory, unequally among the macrotiles, and the system is configured to select the macrotile with the largest allocation of memory to begin image synthesis processing first.

4. The system for use in rendering an image from 3-D graphics data of claim 1, wherein the pixels corresponding to each macrotile are further divided into a respective set of tiles, and the tiling accelerator further is configured to allocate, responsive to demand, portions of a block to store control stream data produced by a tiling engine in the tiling accelerator, the control stream data referencing geometry object data written by the macrotiling engine.

5. The system for use in rendering an image from 3-D graphics data of claim 4, wherein the portions of the one or more blocks allocated to store control stream data allocated on demand to store tile-specific control stream data produced by the tiling engine each are 16 words, of a determined memory word size.

6. The system for use in rendering an image from 3-D graphics data of claim 1, wherein the manager is further configured to allocate a portion of the heap memory to a global display list used to store object data for objects overlapping multiple macrotiles.

7. The system for use in rendering an image from 3-D graphics data of claim 6, wherein the tiling accelerator further is configured to write object identifying information to the global display list for objects determined to overlap more than one macrotile.

8. The system for use in rendering an image from 3-D graphics data of claim 6, further comprising writing object identifying information to the global display list for objects determined to be within a single macrotile, but within a predetermined distance from an edge of that macrotile.

9. The system for use in rendering an image from 3-D graphics data of claim 1, wherein the system is further configured to double buffer address information for a start of a display list for a macrotile and a current end of the display list for that macrotile, and to provide access to one set of the double buffered address information to each of the tiling accelerator and an image synthesis engine.

10. The system for use in rendering an image from 3-D graphics data of claim 1, wherein the system is further configured to begin image synthesis processing of the global display list by creating another context and continuing to process the stream of geometry into macrotile-specific display lists in the new context, while rendering from the global display list and existing macrotile display lists.

11. The system for use in rendering an image from 3-D graphics data of claim 1, wherein the system further is configured to support concurrent processing of geometry produced from a plurality of applications by allowing tiled geometry elements produced by any of the plurality of applications to be rendered into the reserved z buffer memory.

12. The system for use in rendering an image from 3-D graphics data of claim 1, wherein a total size of the heap memory is at least as large as a size required to store z data for all pixels of (n+1) macrotiles, wherein n is the number of macrotiles in the image.

13. The system for use in rendering an image from 3-D graphics data of claim 1, wherein the system is configured to determine to begin processing the selected display list in response to a measure of usage of the heap memory.

14. A method for rendering an image from 3-D graphics data comprising:
    determining a pixel resolution of an image to be rendered;
    defining a set of macrotiles, each macrotile encompassing a respective region of pixels in the image to be rendered;
    allocating reserved z buffer memory, from heap memory, wherein an amount of memory allocated to the reserved z buffer memory is sized to store depth data for pixels in at least one macrotile;
    allocating blocks from the heap memory, responsive to demand, to store geometry object-identifying information and control stream information generated by a tiling accelerator operating on an inputted stream of geometry objects, to create a respective display list for each macrotile overlapped by inputted geometry objects;
    selecting a macrotile, responsive to determining that an amount of memory allocated from the heap memory exceeds a threshold, to begin image synthesis processing, which includes writing depth data to the reserved z buffer memory; and
    reallocating blocks of memory that stored one or more of object identifying information and control stream information for the display list for the selected macrotile first to replace the reserved z buffer memory for use during image synthesis processing of another macrotile at least until there is reserved z-buffer memory for at least one macrotile, and if any blocks of memory remain from the memory used for storing the selected display list, thereafter to provide those blocks for on demand allocation for storing object-identifying information and control stream information produced by the tiling accelerator for additional geometry elements.

15. The method for rendering an image from 3-D graphics data of claim 14, wherein a portion of the heap memory, remaining after the allocation of reserved z buffer memory, is divided among the macrotiles, so that the entire heap memory is assigned either to reserved z buffer memory or to a macrotile.

16. The method for rendering an image from 3-D graphics data of claim 15, wherein the portion of the heap memory, remaining after the allocation of reserved z buffer memory, is divided unequally among the macrotiles, and the macrotile with the largest allocation of memory is selected to begin image synthesis processing first.

17. The method for rendering an image from 3-D graphics data of claim 14, wherein the pixels corresponding to each macrotile are further divided into a respective set of tiles, and further comprising allocating, responsive to demand, portions of a block to store control stream data produced by a tiling engine, the control stream data referencing geometry object data written by a macrotiling engine.

18. The method for rendering an image from 3-D graphics data of claim 14, further comprising allocating portions of the one or more blocks allocated to a given macrotile to store control stream data to store tile-specific control stream data produced for tiles within that macrotile.

19. The method for rendering an image from 3-D graphics data of claim 18, wherein each block is 4KB in size, and the portions of the one or more blocks allocated to store control stream data allocated on demand to store tile-specific control stream data produced by the tiling engine each is 16 words, of a determined memory word size.

20. The method for rendering an image from 3-D graphics data of claim 14, further comprising allocating a portion of the heap memory to a global display list used to store object data for objects overlapping multiple macrotiles.

21. The method for rendering an image from 3-D graphics data of claim 14, further comprising writing object identifying information to the global display list for objects determined to overlap more than one macrotile.

22. The method for rendering an image from 3-D graphics data of claim 14, further comprising writing object identifying information to the global display list for objects determined to be within a macrotle, but within a pre-determined distance from an edge of that macrotile.

23. The method for rendering an image from 3-D graphics data of claim 14, further comprising double buffering address information for a start of a display list for a macrotile and a current end of the display list for that macrotile, and providing access to one set of the double buffered address information to each of a tiling accelerator and an image synthesis engine.

24. The method for rendering an image from 3-D graphics data of claim 14, further comprising, before the stream of geometry objects has been completely inputted, to begin image synthesis processing of the global display list by creating another context and continuing to process the stream of geometry into macrotile-specific display lists in the new context, while rendering from the global display list and existing macrotile display lists.

25. The method for rendering an image from 3-D graphics data of claim 14, further comprising supporting concurrent processing of geometry produced from a plurality of applications by allowing tiled geometry elements produced by any of the plurality of applications to be rendered into the reserved z buffer memory.

26. The method for rendering an image from 3-D graphics data of claim 14, wherein a total size of the heap memory is at least as large as a size required to store z data for all pixels of (n+1) macrotiles, wherein n is the number of macrotiles in the image.

* * * * *